F. GOUBERT.
SNAP FASTENER.
APPLICATION FILED MAR. 28, 1918.
1,299,325.
Patented Apr. 1, 1919.
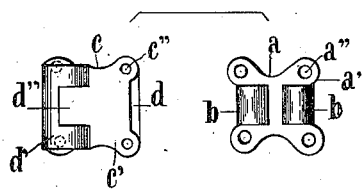
Fig. 1.
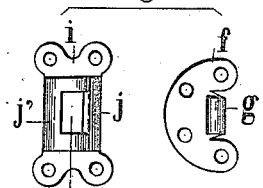
Fig. 3.
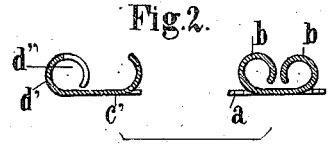
Fig. 2.
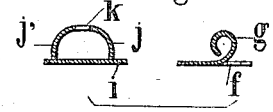
Fig. 4.
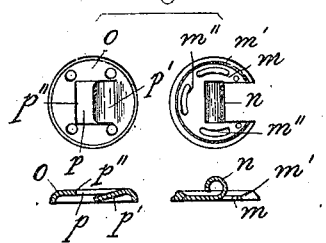
Fig. 5.
Fig. 6.
INVENTOR
Floris Goubert
BY
ATTORNEY

UNITED STATES PATENT OFFICE.

FLORIS GOUBERT, OF PARIS, FRANCE.

SNAP-FASTENER.

1,299,325.  Specification of Letters Patent.  Patented Apr. 1, 1919.

Application filed March 28, 1918. Serial No. 225,373.

*To all whom it may concern:*

Be it known that I, FLORIS GOUBERT, a citizen of the Republic of France, residing at Paris, France, have invented certain new and useful Improvements in Snap-Fasteners, of which the following is a specification.

The present invention relates to snap fasteners; and it comprises, briefly, a device of the general class or character specified having certain improvements, hereinafter fully described, whereby its two component members may be readily coupled together, and, when in such condition, will be held against accidental uncoupling due to the imposition of lateral strains thereon. The invention further resides in the provision of a snap fastener of the kind above-described, which is simple in construction and may be manufactured at a low cost.

The accompanying drawing shows, by way of example, several practical embodiments of the invention; but it is to be understood that no limitation to any of the structural details therein illustrated is contemplated, excepting in so far as may be specified in the invention as actually claimed.

In said drawing:

Figure 1 is a plan view, showing one form which the two members of the fastener may take, said members being represented as uncoupled from each other.

Fig. 2 shows said members in transverse section.

Figs. 3 and 4 are views similar, respectively, to Figs. 1 and 2, but illustrating a second form of the invention.

Figs. 5 and 6 are, in like manner, similar views of a third form.

As shown in said drawing, the fastener consists, in each instance, of two coöperating or companion members, viz., a male member and a female member, adapted to be engaged with or coupled to each other, the female member having a bearing, or its equivalent, for the reception of a cylindrical or rolled spring tongue which is provided on the male member. In each case, also, each member consists of a stamped or cut-out metal plate, which is provided with holes for the passage of threads or stitches to fasten it to its carrier, though it may be attached to the latter in any other suitable manner.

In the form shown in Figs. 1 and 2, the male member $a$ comprises a metal plate $a'$, having the thread holes $a''$, and also having two upstanding, cylindrical spring tongues $b$, these tongues being struck up from the plate and rolled over toward each other so that their free ends are on their inner sides and face each other. The female member $c$ consists essentially of a metal plate $c'$, provided with thread holes $c''$ and with two spring bearings $d$, $d'$, of which the bearing $d$ is rolled slightly, as shown, and has a length equal to that of the tongues $b$ on the male member, while the other bearing $d'$ is cylindrical and is furnished with a notch $d''$, likewise equal to the length of the said tongues $b$, so that the corresponding tongue may be inserted through it.

It will be apparent, therefore, that when the two tongues $b$, $b$ are snapped into the space between the bearings $d$, $d'$, a rigid coupling of the male member to the female member will be obtained; and that to separate or uncouple the two members, it will be necessary to exert a pull of considerable force in a direction normal to said members, pressure or pull in a lateral direction occasioning no separating action whatever. The connection or retention of the two members is due, of course, to the introduction of part of the tongues $b$ beneath the two bearings $d$, $d'$, the latter having substantially the same diameter as the former; and because of that fact, the bearings may expand slightly, or the tongues may be slightly compressed during the coupling, or both expansion and compression may take place, as will be understood.

In the construction illustrated in Figs. 3 and 4, the male member $f$ is equipped with a single cylindrical spring tongue $g$; while the female member is formed with two metal bearings $j$, $j'$, between which there is produced, as before, a notch $k$ to receive said tongue. Attachment is effected by the tongue $g$ being introduced through the notch $k$, the latter having a width somewhat less than the diameter of the tongue, so that said tongue is necessarily somewhat compressed during its insertion through the notch $k$.

The third form, represented in Figs. 5 and 6 embodies the same principle and the same, or equivalent, parts or members as the first two forms, differing therefrom in structural details only. Thus, the male member consists of a metal plate $m$, slit at its center and rolled in such a way as to form a substantially-diametrical cylindrical tongue $n$, similar to the tongues $b$ and $g$, the requisite stiffness being imparted to said plate by providing it with a marginal rib $m'$. Thread holes $m''$ are also formed in the plate, or any other desired means of attachment may be employed. The female member consists of a plate $o$, which may or may not have a strengthening rib, and which is provided with a central opening or notch $p$. This opening $p$ is produced by slitting the plate $o$ to form a metal strip or tongue $p'$, which is bent slightly inward and against which the tongue $n$ presses, and along which it moves on being forced into the opening $p$, when the two members are being fastened together. The engagement of the two members is effected by forcing the tongue $n$ into the opening $p$, where it is maintained, due to its resilience, by the edge $p''$ of the opening, the resistance to disengagement being caused by the disposition of the median part of the tongue beneath the said edge $p''$ which functions as a stop. The plate $o$ itself forms the bearing in this construction, and is arched, as shown.

The fastener may, of course, be made of any suitable material, though metal is specified in the above description, and in any desired sizes.

I claim as my invention:

1. A snap fastener, comprising co-acting male and female members each consisting of a plate of resilient material; the male member having a portion which is rolled upon itself toward the center of said member to from a straight, cylindrical spring tongue, and the female member providing a bearing having an opening formed in its surface through which said tongue is adapted to be inserted to permit its engagement with the bearing.

2. A snap fastener, comprising co-acting male and female members each consisting of a plate of resilient material; the male member having an integral, cylindrical spring tongue, and the female member providing an arched bearing having a notch through which said tongue is adapted to be inserted to permit its engagement with said bearing; said tongue being compressed during such engagement and thereafter tending to expand, to maintain the engagement.

3. A snap fastener, comprising co-acting male and female members each consisting of a plate of resilient material; the male member having a portion which is rolled upon itself toward the center of said member to form a cylindrical spring tongue disposed substantially diametrically of said member, and the female member being arched and provided with a central opening and with a downwardly inclined tongue in said spring, the cylindrical tongue being adapted to move along the inclined tongue during the coupling of the two members, and to be forced into said opening on passing beyond said inclined tongue, the edge of the opening opposite the free end of said inclined tongue forming a stop to prevent accidental withdrawal of the cylindrical tongue from said opening.

In testimony whereof I affix my signature.

FLORIS GOUBERT.